United States Patent [19]

Acquaviva

[11] 4,384,782
[45] May 24, 1983

[54] 1 TO N ORDER DOCUMENT COPYING

[75] Inventor: Thomas Acquaviva, Penfield, N.Y.

[73] Assignee: Xerox Corporation, Stamford, Conn.

[21] Appl. No.: 237,781

[22] Filed: Feb. 24, 1981

[51] Int. Cl.³ .................. G03G 15/00; B65H 1/04; B65H 31/00

[52] U.S. Cl. .................. 355/3 SH; 271/3.1; 271/197; 271/212

[58] Field of Search .................. 271/3.1, 212, 3, 4, 271/5, 6, 7, 65, 186, DIG. 9, 197, 195; 355/3 SH, 14 SH, 75, 76; 414/32, 33, 34, 92, 93, 94, 95, 96

[56] References Cited

U.S. PATENT DOCUMENTS

| | | | |
|---|---|---|---|
| 2,987,314 | 6/1961 | Monaghan | 271/212 X |
| 3,030,867 | 4/1962 | Wright | 414/96 X |
| 3,687,448 | 8/1972 | Vora | 271/21 |
| 3,702,697 | 11/1972 | Leutwein et al. | 271/3 |
| 3,727,910 | 4/1973 | Vora | 271/19 |
| 3,799,537 | 3/1974 | Cobb | 271/3 |
| 3,947,018 | 3/1976 | Stange | 271/197 X |
| 3,971,554 | 7/1976 | Stange | 271/212 X |
| 4,040,616 | 8/1977 | Clarkson et al. | 271/65 |
| 4,067,568 | 1/1978 | Irvine | 271/212 X |
| 4,158,500 | 6/1979 | DiFrancesco et al. | 271/3.1 X |
| 4,166,614 | 9/1979 | Hamlin et al. | 271/3.1 |
| 4,176,945 | 12/1979 | Holzhauser et al. | 271/65 X |
| 4,184,671 | 1/1980 | Sasamori | 271/18 |
| 4,190,354 | 2/1980 | Smith et al. | 271/3.1 X |
| 4,229,101 | 10/1980 | Hamlin et al. | 271/3.1 X |
| 4,278,344 | 7/1981 | Sahay | 271/3.1 X |

FOREIGN PATENT DOCUMENTS

| | | | |
|---|---|---|---|
| 20973 | 1/1981 | European Pat. Off. | 271/3.1 |
| 22210 | 1/1981 | European Pat. Off. | 271/3.1 |

*Primary Examiner*—Bruce H. Stoner, Jr.

[57] ABSTRACT

An apparatus 20 and method for recirculating document sheets to and from the imaging station 23 of a copier 10, with seriatim feeding and inverting of a set of individual conventional flimsy document sheets unescorted (without a carrier) to and from a stack of document sheets loaded in a stack support 22 overlying the imaging station 23, to provide for properly collated output copy sets from the copier, with loading the stack of document sheets face-up in said stack support in normal forward serial page order, feeding 28 the document sheets so loaded from one end of the top of said stack seriatim in forward serial page order for copying, and restacking 70 the copied document sheets seriatim on the bottom of the opposite end of the same stack in the same order, to provide continuous document sheet recirculation in said forward serial page order. The restacking preferably includes intermittent lifting 72 of the stack from one end, a vacuum belt sheet transport 74 and air flotation 76 of the stack. Compatible alternative duplex document recirculative copying 58 is provided.

2 Claims, 6 Drawing Figures

1 TO N ORDER DOCUMENT COPYING

The present invention relates to an improved document handling system for providing recirculatory precollation copying in forward serial page order of document sheets stacked over the imaging station of a copier in which the documents are fed from the top of the stack and returned to the bottom of the stack. It is usable with various document handling apparatus and copiers.

Various of these are disclosed in the art cited herein, which is incorporated by reference to the extent of its teaching of relevant further details, alternatives and background. This art, which is discussed in the citations thereof filed with this application, includes the following Patents and Applications: U.S. Pat. Nos. 3,799,537; 3,947,018; 4,040,616; 3,829,082; 4,067,568; 3,971,554; 4,190,354; 4,184,671; 4,229,101; 3,937,454; 4,076,408; 4,078,787; 4,099,860; 4,169,674; 4,179,215; 4,099,150; 4,140,387; 4,158,500; 4,176,945; 3,687,448; 3,727,910; U.S. Ser. Nos. 223,538; 71,613, now U.S. Pat. No. 4,278,344; Ser. No. 155,868, now U.S. Pat. No. 4,355,880; and German Patentschrift No. 1,128,295.

As xerographic and other copiers increase in speed, and become more automatic, it is increasingly important to provide higher speed yet more reliable and more automatic handling of both the copy sheets and the original document sheets being copied, i.e. both the output and input of the copier. The providing of precollation copying, especially with duplex document sheets, greatly complicates and increases the document and copy sheet handling complexities.

In the description herein the term "sheet" generally refers to conventional flimsy sheets of paper, plastic, or other conventional or typical individual image substrates (original or copy), and not to microfilm or electronic image originals, or semi-rigid image carriers, or cards, which are generally much easier to manipulate. A "simplex" document or copy sheet is one having its page and image on only one side or face of the sheet, whereas a "duplex" document or copy sheet has pages and images on both sides. The present invention is particularly suitable for precollation, i.e. multiply automatically recirculated document copying, but is also highly compatible with non-precollation copying.

Precollation, or collation copying, as it is variably called, is a known desirable feature for a copier, which provides a number of important advantages. In precollation copying any desired number of precollated copy sets may be made by making a corresponding number of recirculations of the original document set in collated order past the copier imaging station and copying each document page only once each time it circulates past the imaging station. The copies automatically exit the copier in precollated sets, and thus do not require subsequent sorting in a sorter or collator. On-line finishing and/or removal of completed copy sets may thus be provided while further copy sets are being made from the subsequent circulations of the same document set.

However, a disadvantage of precollation copying systems is that the documents must all be repeatedly circulated, and copied in a predetermined order, by a number of circulations equivalent to the desired number of copy sets. Thus, increased document handling is necessitated for a precollation copying system, as compared to a post-collation copying system. Therefore, maximizing document handling automation, job recovery from jams or misfeeds, and copying cycle efficiency, is particularly important in precollation copying. If the document handler cannot efficiently and rapidly circulate and copy documents in coordination with copy sheets in the correct order, or must skip documents or copying cycles, the total copying time for each copy set will be increased. For effective job recovery it is essential to know which document and which page was being copied when the jam occurred so that the correct copies may be made up and the correct copying sequence resumed. This is greatly facilitated by a forward serial page order (1 to N) document copying system as disclosed herein.

In contrast, in a *post*-collation copying system, plural copies are made at one time from each document page and collated by being placed in separate sorter bins. The document set need only be circulated or manually or semi-automatically fed to the imaging station once and multiply copied during that circulation to fill bins of the copy sheet sorter or collator with the corresponding number of copy sets desired. A disadvantage is that the number of copy sets which can be made in one document circulation is limited by the number of available bins. Also, a sorter adds space and complexity and is not well suited for on-line finishing. However, post-collation copying and manual document placement are desirable in certain copying situations to minimize document handling. Thus, it is desirable that a precollation copying system be compatible with, and alternatively usable for, post-collation copying as well. The present system is particularly so, since both manual and post-collation copying typically use 1-N order document copying.

The 1 to N precollation copying system disclosed herein also avoids a non-copying initial counting circulation of documents for N to 1 copying as described in U.S. Pat. No. 4,330,197, by R. E. Smith and J. R. Yonovich and the same assignee, which reduces first-copy-out-time.

Conventional integral software incorporation into the copier's general microprocessor logic circuitry and software of the control functions and logic herein, as taught by the above and other patents and copiers, is the current state of the art and is preferred. Further examples of other copier systems with particular reference to detailed examples of control systems for both document and sheet handling and coordination therebetween are described in U.S. Pat. No. 4,062,061, issued Dec. 6, 1977, to P. J. Batchelor et al; U.S. Pat. No. 4,123,155, issued Oct. 31, 1978, to W. L. Hubert (IBM); U.S. Pat. No. 4,125,325, issued Nov. 14, 1978, to P. J. Batchelor et al; and U.S. Pat. No. 4,144,550, issued Mar. 13, 1979, to J. M. Donohue et al. However, it will be appreciated that the document feeding functions and systems disclosed herein may be alternatively conventionally incorporated into a copier utilizing any other suitable or known copier software or hard wired logic systems, cam-bank switch controllers, etc. The control of all of the exemplary sheet handling systems disclosed herein may be accomplished by conventionally activating them by signals from the controller in response to simple programmed commands and switch inputs from the copier console selected by the operator, such as selecting the number of copies, selecting simplex or duplex copying, selecting whether the documents are simplex or duplex, etc. These signals actuate conventional electrical solenoid or cam controlled sheet deflector fingers and drive motors or their clutches in the selected steps or sequences as programmed. Conventional sheet path sensors or switches and bail bars, connected to the controller, may be utilized for counting and keeping track of the positions of documents and copy sheets, as is well known in the art, and taught in the above and other patents and products. Known precollation copying systems utilize such conventional microprocessor control circuitry and connecting switches for counting the number of document sheets as they are recirculated, counting the number of completed document set circulations, and thereby controlling the operation of the document and copy sheet feeders and inverters, etc.

To summarize the above cited art, both forward serial order ("1 to N") and reverse order ("N to 1") precollation copying of original documents is known in the art, for both simplex (one-sided) and duplex (two-sided) original documents and copies. However, in current products and said art, N to 1 (reverse order) document set circulation is conventional for systems feeding from a stack of documents positioned (loaded) over a platen of a copier. In such conventional systems the documents are loaded face-up and fed out from the bottom of the stack and restacked on the top of the stack. The simplex documents are circulated by being turned over, copied, turned over again, and returned back to the top of the stack over the platen. While bottom document restacking is known in the sheet feeding art, it is not typical and is generally considered disadvantageous because of the difficulty of reinserting and realigning a flimsy sheet under a stack of such sheets without sheet carriers, particularly since the overlapping stack weight is generally variable due to variable sheet weights and variable stack heights.

A major disadvantage of the prior art N to 1 or backwards document feeding and copying order is that the copier controller does not know what document is being fed on the first circulation, since the last page is fed first. In contrast, in 1 to N document feeding the first document fed is known to be page 1, which is known to be the odd page; the second document fed is known to be page 2, an even page; etc. Thus, in 1 to N copying, the copier controller can know whether a document being fed and copied is odd or even just from the count of the number of document sheets which have been fed from the document stack. This is not true for N to 1 document circulation. Not knowing whether the documents being fed are odd or even, and duplexing accordingly, has distinct disadvantages for making duplex (two sided) copies, where if the number of original document pages is odd, the last duplex copy sheet will be blank on one side. This problem has lead to simplex/duplex copying with either precounting of the entire document set before copying, in a non-copying circulation, or selective use of a copy sheet inverter in the copy sheet path and other disadvantages, as explained more fully in U.S. Pat. Nos. 4,330,197 and 4,278,344, and U.S. Pat. No. 4,166,614 at Col. 18.

Precount cycles and/or selective use of a copy sheet inverter adversely affect the system reliability by requiring extra handling of the document set and running the copy sheets past additional deflector fingers and in and out of an inverter, with extra or different handling and timing. In addition, the precount cycle may decrease the perceived productivity of the system by cycling the document handler without imaging the originals at the beginning of copying when it is most noticeable and when there is no copy sheet output finishing or handling to occupy the operator's time. For a larger document set there is a corresponding increase in first copy out time for simplex/duplex copying using a precount circulation.

Not knowing whether a document being fed is an odd or even page number on the first circulation particularly complicates the simple/duplex operation of a copier when it is desired to use letterhead, binder edged, prepunched, marginal, or other special copy sheets which require a particular face or orientation of the copy sheet to be printed or bound. For example, with letterhead paper, for duplex copying page 1 must be printed on the letterhead side, not the obverse side. Using paper with ring or spiral binder holes, the odd document pages should be copied so that the holes are on the left hand side of the page and the even document pages should be copied so that the holes are on their right. If the copier finisher has a stapler for one corner, the copy sheets should be placed in the finisher automatically in the correct orientation for stapling in the correct corners.

Another disadvantage of N to 1 document feeding is that since the count of the number of documents fed differs from the document page number, jam recovery is also more complicated. If a document feeding jam occurs, particularly during the first circulation, the copier controller, cannot automatically know the page number of the document which is being copied when the jam occurred. For example, if a jam occurs on the third document sheet being fed, the copier can only tell that this is the third sheet from the bottom of the stack of documents. It is not page 3. The page number, or whether the page is odd or even, cannot be known until after counting the whole N to 1 stack once, or manual inspection. Further, when a jam occurs, particularly on a first set, a partially completed N to 1 copy set will be undesirably missing its initial pages (1, 2, 3, etc.) rather than its final pages.

However, N to 1 document recirculation has been commercially utilized in spite of these disadvantages because it is suitable and conventional for a "racetrack" or over-platen loop circulation path, in which the documents are recirculated to and from a document stack located over the copier platen, as shown in the above-cited references. Simplex documents are fed from one edge of the stack to the same side or edge of the platen underneath the stack and back from the opposite edge of the platen to the opposite edge of the stack, and therefore may be stream fed unidirectionally over the platen, feeding one document on while the prior one is feeding off. The document path has a 180° loop turn at each side of the platen which is generally a short path. With such a shorter and unidirectional "racetrack" loop path length, document transport speeds can be lower and two or three sheet document set handling without skipped copy cycles can be achieved more easily than most non-racetrack systems.

Such a known over-platen or "racetrack" system is generally also more horizontally compact than other non-racetrack precollation devices. For example, a known 1-N "Y" configuration document recirculator using a side-by-side document stack feeder and platen transport takes up more horizontal working space on the top machine surface although it may be thinner (less vertical space). A conventional "racetrack" configuration places the document stack, document feeder, document turn transports or inverters, and platen transport all substantially overlying the platen.

The present invention overcomes many of the previously discussed and other problems, yet provides the above advantages of *both* 1 to N copying *and* a "racetrack" or over-platen stack document loop path.

The 1-N system disclosed herein has even further advantages. It can readily have a paper path compatible with both pre and post-collation output or finishing. Even if the paper path within the copier was originally planned for an N to 1 copy sequence, the system disclosed herein can be utilized. For example, the finisher module provided can be one which inherently inverts each output sheet before stapling the set. If the document handler is operated in post-collation mode, the finisher module can be replaced with a sorter module which also inverts each output copy sheet before placing it in appropriate bins.

Another advantage of this 1-N and racetrack RDH is that it can be more readily used selectively as a non-recirculating document feeder by eliminating the document return path to the stacking tray of the RDH, and instead exiting documents (either fed from the stack or manually inserted) off to the side of the platen after they are copied. This provides known alternative automatic or semi-automatic document feeding using the same basic RDH apparatus. With a 1 to N system the originals are ejected and stacked in the proper, and the same, sequence, i.e. 1-N and face-down in a document catch tray, adjacent the platen. On an N-1 racetrack RDH such ejected originals would be stacked in the wrong order (not properly collated).

A preferred specific feature of the invention is to provide, as disclosed hereinbelow, an apparatus for and a document handling method for recirculating document sheets to and from the imaging station of a copier, with seriatim feeding and inverting of a set of individual conventional flimsy document sheets unescorted (without a carrier) to and from a stack of document sheets loaded in a stack support overlying the imaging station, to provide for properly collated output copy sets from the copier with an improvement comprising the steps of:

loading the stack of document sheets face-up in said stack support in normal forward serial page order, so that the first page sheet is on top of the stack;

feeding the document sheets so loaded from one end of the top of said stack seriatim in forward serial page order for copying at the imaging station;

inverting the document sheets once between said feeding from the top of the stack and said imaging station;

inverting the document sheets once again between said imaging station and said stack; and restacking the copied document sheets seriatim on the bottom of said stack in said same stack support in the same order and without interfering with said feeding of sheets from the top of said stack to provide substantially continuous document sheet recirculation in said forward serial page order, so that the copy output will be in forward serial page order.

Further preferred features are to provide in said restacking step intermittent lifting of the stack from one end, vacuum belt restacking and air flotation of the stack.

Another preferred feature is to provide compatible alternative duplex document recirculative copying.

Further features and advantages of the invention will be better understood by reference to the following description, and to the drawings forming a part thereof, wherein.

Figure 4:
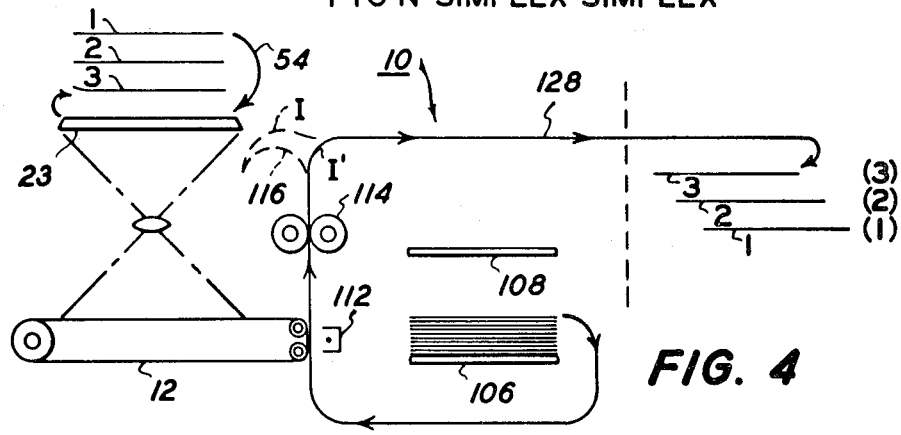
Figure 5:
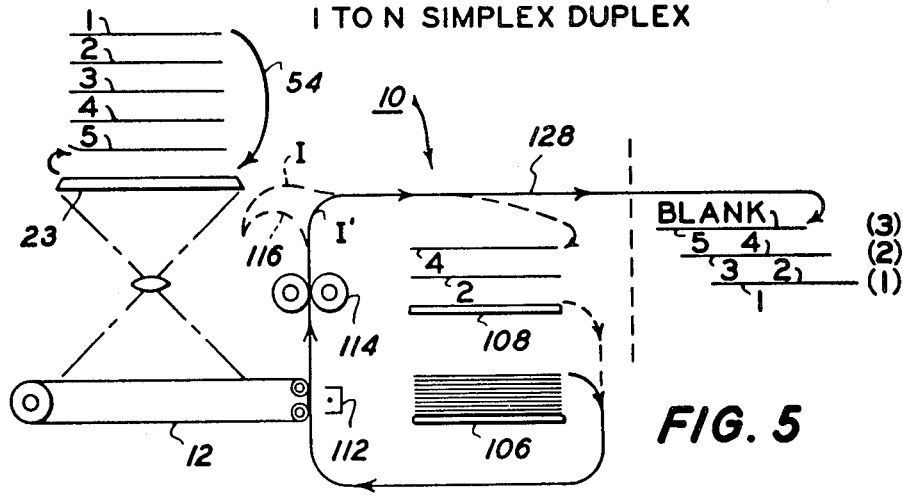
Figure 6:
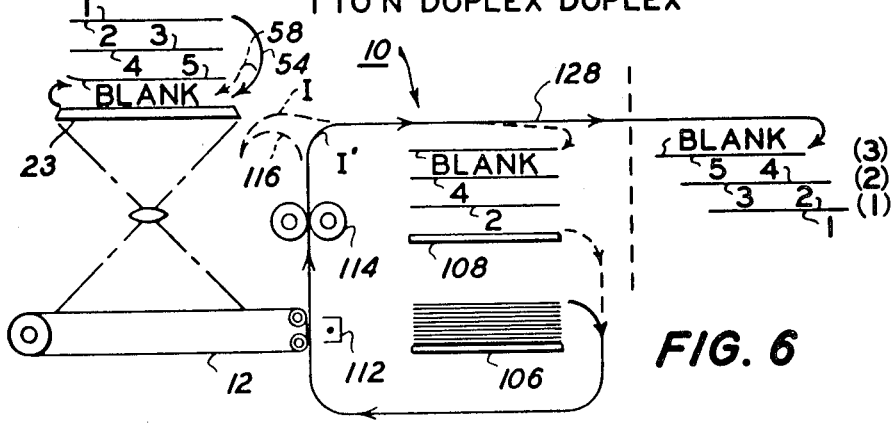

FIGS. 4, 5, and 6 schematically illustrate, respectively, an exemplary copier in simplex/simplex, simplex/duplex and duplex/duplex modes of operation with the 1-N document handling method and apparatus.

Figure 1:
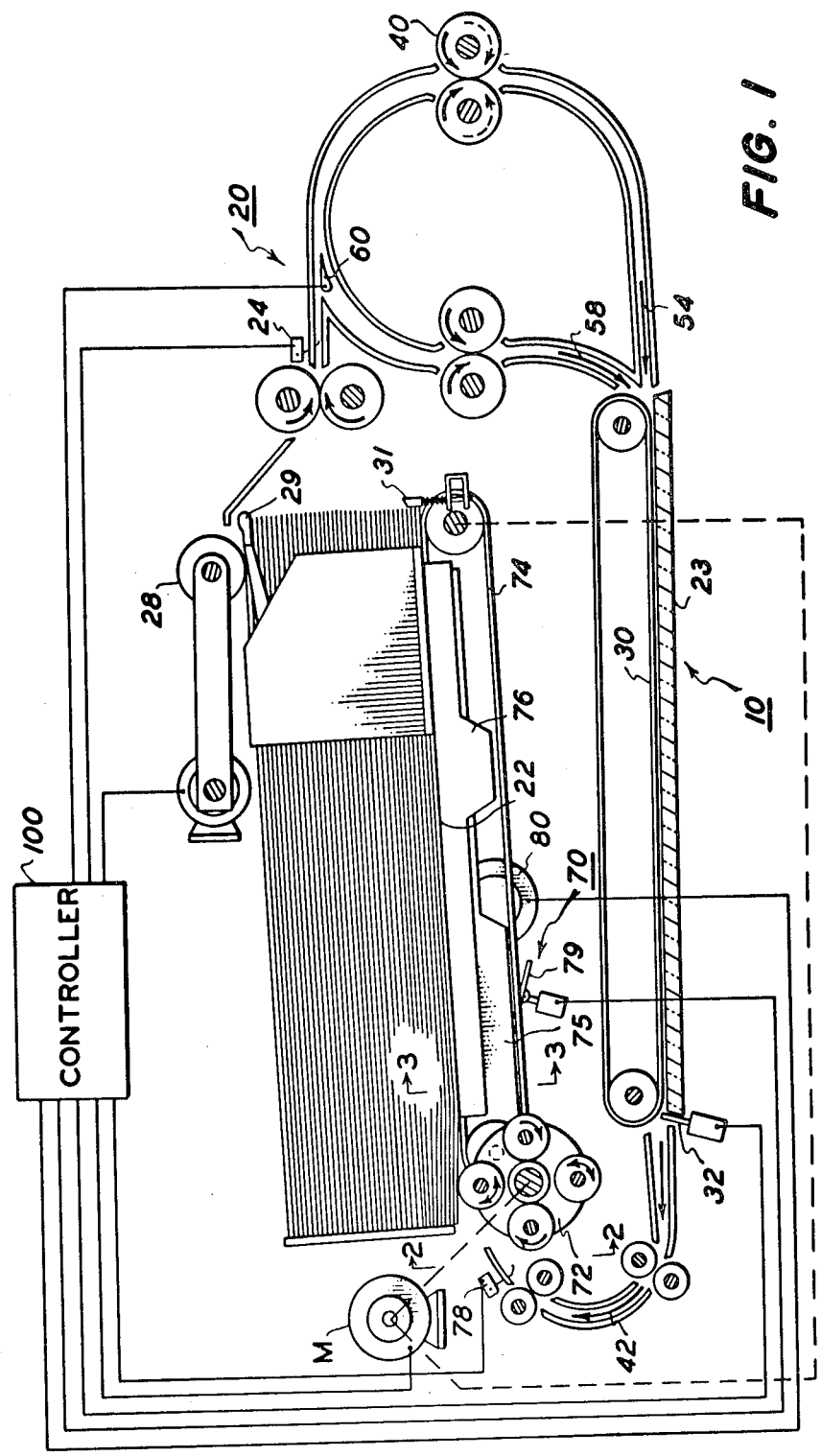
FIG. 1 is a schematic side view of an exemplary recirculating document feeder utilizing the present invention.
Figure 2:
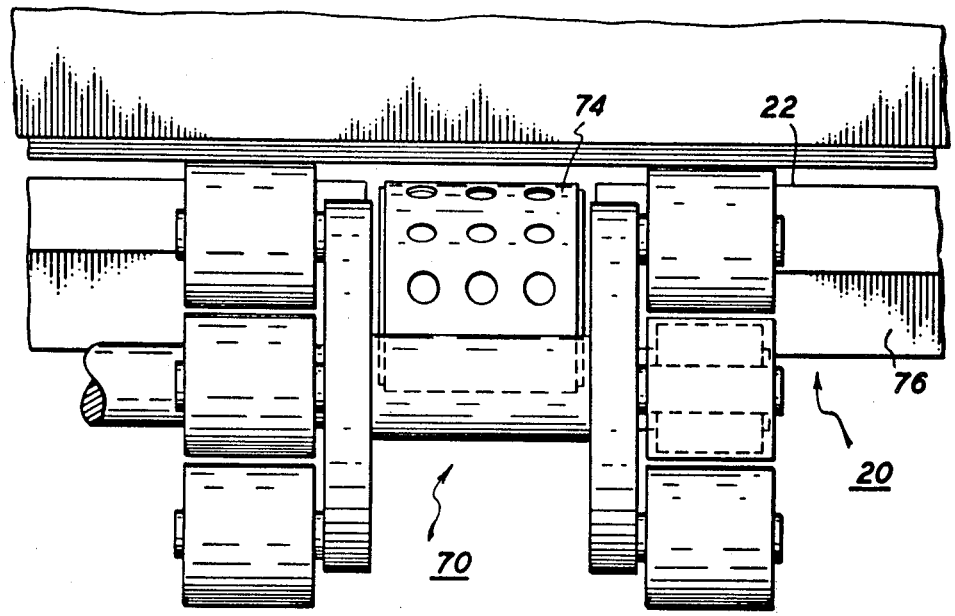
FIG. 2 is an end view of the apparatus of FIG. 1 along the lines 2—2 thereof.
Figure 3:
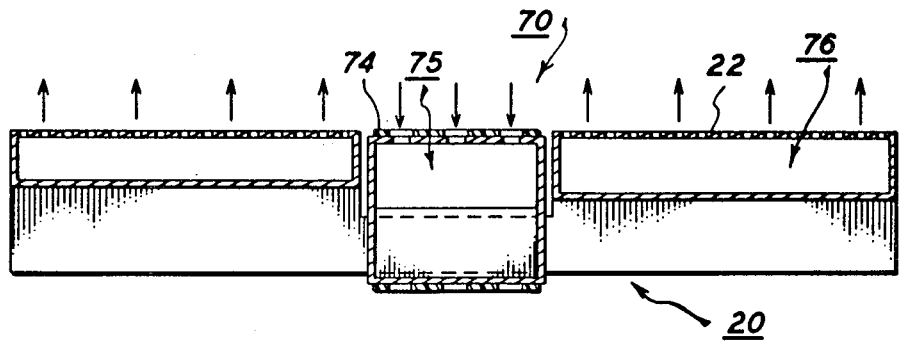
FIG. 3 is a cross-sectional view taken along the lines 3—3 of FIG. 1.

Referring to the exemplary automatic document feeding unit 20 of FIGS. 1-3, and copier 10 of FIGS. 4, 5 and 6, it will be appreciated that various other alternative recirculating document feeding units and copiers may be utilized with the present invention, including various ones disclosed in the above-cited references.

In the exemplary recirculating document handler (RDH) 20 disclosed here, individual original document sheets are sequentially fed from a stack of document sheets placed by the operator face-*up* in normal forward collated document set order in the document stacking and holding tray 22, i.e. with page 1 on the top of the stack, face-*up*. The document sheets are fed from the *top* of the stack seriatim to the imaging station 23, which is the conventional copying platen or other system of the copier 10, to be conventionally imaged onto a photoreceptor 12 for the production of copies in a generally conventional xerographic manner. The documents are stacked initially, and also restacked automatically at the end of each circulation, in the tray 22 over the platen 23. However, here, unlike a conventional recirculating document handler, the documents are restacked seriatim under the *bottom* of the stack of document sheets in the tray 22.

The document handler 20 has conventional switches or other sensors, e.g. 24, for sensing and counting the individual documents fed from the tray 22, i.e. counting the number of document sheets circulated. An otherwise conventional resettable bail or finger rises thru the stack as sheets are fed under it to indicate through its associated switch or sensor the completion of each circulation of the complete document set, by sensing when all the documents have been fed out from above the finger (by flipping up to actuate a switch), and then the finger is automatically reset on the bottom of the stack before the next circulation. The document feeder 20 is adapted to serially sequentially feed the documents, which may be various conventional sizes and weights of sheets of paper or plastic containing information indicia to be copied on one or both sides, e.g. printed or typed letters, drawings, prints, photographs, etc. A convential top feeder 28, shown in FIG. 1, feeds the upper-most document sheet, on demand by the copier controller 100, from the stack through one of two selected feed paths (described below) to a platen drive belt 30 which moves the document into a registration position, against a registration gate 32, over the copier platen 23, where the side of the document facing the platen 23 is copied. Alternatively, rollers, vacuum belts or other sheet transports may be utilized, including constantly moving document (slit scanning) systems.

As further shown in FIG. 1, in the document feeder 20 each document is selectably inverted or not inverted as it is fed from the tray 22 to the imaging station 23 through one of two paths selectable by the controller. Thus, this is accomplished here before the document is copied. The two paths here are provided by a selectably reversable sheet drive roller (inverting roller) pair 40 and a selectable position gate or deflector 60 in the document path. Each document sheet is fed initially from tray 22 around the outside path or loop to the rollers 40. If the document sheet path is continued through rollers 40, the sheet is fed through a first path 54 onto the platen 23, conventionally, with a single inversion.

The decision gate 60 in the document path here is upstream the entrance to roller nip 40 and comprises pivotable, normally raised, deflector fingers which may be lowered after the trail edge of the document has passed this gate 60. (Switch 24 or another switch can sense the trail edge and start a count of sufficient time for it to pass). Subsequent actuation of the gate 60, together with coordinated reversal of the rollers 40, causes the movement of the document to reverse and pass through a second and different transport path 58 to the platen for copying duplex documents. In the art this path 58 apparatus is called an "inverter" even though the document is not inverted at this point, as described below. The second transport path 58 provides no sheet inversion between the document sheet stack and the platen, whereas the first transport path 54 inverts a document sheet once between the stack and the platen. In the inverter operation for path 58, the reversal of the rollers 40 causes the documents to be reversed in direction before reaching the platen and fed directly back through the gate 60. The now-raised gate 60 deflects the reversed document into the path 58 which feeds directly onto the platen 23.

Thus, in this non-inverting path 58, the documents arrive at the platen with the same orientation as their original orientation in tray 22. Documents initially stacked face-up in the tray 22 will thereby still be face-up when they reach the platen 23 for copying, providing the path 58 is utilized.

In contrast, the first inverting transport path 54 transports the documents unidirectionally and without reversal onto the platen 23. Thus, the orientation or facing on the copy platen 23 of documents fed through the simplex path 54 is inverted from the previous orientation of those documents in the tray 22. Here, this path 54 is the only path utilized for simplex document sheets, since here these sheets are stacked face-up in the storage tray 22 and must be face-down on the platen 23 to be copied. This is schematically illustrated in FIGS. 4 and 5.

The return path of the documents to the tray 22 from the platen after they are copied is always the same here, regardless of which of the two initial paths 54 or 58 is used. This document return path has a single sheet inversion, provided by feeding the documents around a second, but non-reversing, inverting roller document feeding system 42, which returns the documents to be restacked on the bottom of the stack in tray 22.

Thus, in the total circulation path from the top of the stack in tray 22 back to the bottom thereof, with the selection of the transport path 54 the documents are inverted twice, whereas with the selection of the transport path 58 the documents are only inverted once. Therefore, it may be seen that the non-reversal or reversal of the rollers 40 and the coordinate non-actuation or actuation of the selector gate 60 therewith during a document set circulation determines whether that set of documents will be recirculated with a total of two or one inversions in that circulation. In either case, since the documents can be continuously bottom restacked simultaneously with continuous top feeding by the feeder 28, continuous multiple recirculations can be provided for precollation copying. With two total path inversions per circulation (i.e. utilizing the path 54), there is effectively no inversion per circulation. Thus, the documents will be restacked in the tray 22 in their same original orientation, and the same sides of the documents will be exposed in the next circulation. In contrast, with only one total path inversion per circulation (using the path 58) the documents will be restacked in the tray 22 inverted from their previous orientation. Thus, the apparatus of path 58 is referred to as the "inverter" because its total circulation path effect is inversion, even though its local effect is actually non-inversion as noted above.

The inversion step or path 58 is normally used to copy the opposite sides or faces of duplex documents in their subsequent circulation loop, as shown in the above-cited art, and in FIG. 6.

In the method of precollation copying of a set of plural (multi-page) simplex document sheets disclosed herein, the document sheets are presented seriatim to the imaging station 23 of the copier 10 in forward serial (1 to N) page order. They are multiply, individually recirculated from the top sheet in the stacked set of the document sheets to the imaging station, copied only once on one side per circulation at the imaging station, and then returned as to the bottom sheet of the same stack, in a recirculatory loop path. However, the document handling system used herein (by reversal of belt 34 after copying the first side and path 54 and return through path 58 for immediate inversion of duplex documents) can also be used in an "immediate duplex" system as described for example in the above-cited U.S. Pat. Nos. 4,176,945 or 4,158,500.

The bottom document sheet restacker 70 disclosed herein will now be described, with particular reference to FIGS. 2 and 3 as well as FIG. 1. This disclosed means 70 for feeding the document sheets under the other sheets of the document set in tray 22 is exemplary, and other such systems may be utilized. Part of this system 70, the "spider roll" mechanism 72, is described in further detail in the cited U.S. Pat. No. 4,067,568. This mechanism 72 is exemplary of a lifting and in-feeding means for intermittently lifting one end of the stack to assist in the restacking of sheets thereunder. However, here the sheets are not "pushed" under the stack, since that is not reliable for flimsey, unescorted, conventional document sheets. Here this lifting is combined with a vacuum belt transport 74 to pull the sheets in all the way, and an air flotation (stack lifting) manifold system 76. Both the lifting system 72 and vacuum belt 74 are driven by a motor "M" and controlled by the controller 100 and a switch 78 here.

With this modified spider roll 72, as the lead edge of the document sheet is returning to the tray 22 area, a rotating lifting roll on the unit 72 momentarily lifts the trailing edge portion of the stack, i.e. the opposite end from the feeder 28. The position of the incoming document is synchronized (e.g. with switch 78) to the motion of the spider roll 72 so that the document lead edge is inserted under the bottom of the stack as the stack is being lifted by the unit 72. Planetary drive (rotation in the feed-in direction) of the feeding rolls extending from the spider roll unit 72 can help feed in the document sheets to vacuum belt 74. As the spider roll unit 72 continues to rotate, the stack is lowered, and vacuum belt 74, substantially level with the bottom of tray 22, captures the document sheet and drives it forward under the stack to a lead edge stop 31.

Since the belt 74 extends all the way to the forward registration edge, the chance of buckling light weight documents is greatly reduced. Also note that the further the document is pulled under the stack, the larger the area of belt 74 which engages the document. Air flotation in the tray of the overlying stack everywhere outside the belt 74 area helps this bottom restacker. The belt 74 is preferably only a relatively narrow, and central, area of the tray 22 bottom, to reduce potential skewing of the documents and to allow deskewing at the front registration stop.

The drive for the vacuum belt transport 74 can be stopped as soon as each sheet is restacked, and/or the vacuum manifold 75 for the vacuum belt 74 can be vented to atmosphere to remove the vacuum with a solenoid activated valve 79, to allow slippage between the belt and the document. This can be actuated by a time delay after the trail edge of the sheet being restacked passes switch 78, or other suitable sensors or controls.

A single blower 80 can be used to draw the vacuum in manifold 75 and also to blow the same air out of the apertures underlying the rest of the stack in manifold 22 to provide air flotation of the stack weight and also percolation of air through the bottom-most sheet to aid the movement (slippage) of that sheet under all of the overlying sheets.

Although the top sheet feeder 28 and its associated corner snubbers 29 illustrated in FIG. 1 are of the conventional known type further described in cited U.S. Pat. Nos. 3,713,645 and 3,687,448, any other suitable top feeder may be used. For example, the top feeder may use vacuum belts and an air knife, or a rotating vacuum roll, and separation may be assisted by air jets along the side of the stack. Here the snubbers 29 register the lead edge of the documents and also assist in the separation process. However, as is well known, such snubbers are not essential. The top feeder 28 and the snubbers (if any) separate the top sheet from the stack and transport it to a set of take-away rolls, as shown. The individual sheet is then transported to the platen for imaging.

Associated with the feeder 28 and its snubbers 29 here is a stack re-registration assistance device 31. These are small obstructions or impeding barriers or snubbers extending upwardly at the front edge of the floor or bottom of the restacking tray 22 at the line or position where restack registration is desired. This coincides with the top feeding registration position of the top snubbers 29. As each document sheet is being restacked its forward or lead edge strikes these members 31, which are preferably spaced at opposite sides of the tray 22. This stops the forward movement of the document sheet being restacked and also deskews it.

For document sheet stacks of less than a predetermined thickness, as an additional feature, these barriers 31 here can be spring loaded as shown and automatically deflected down out of a sheet impeding position by the snubbers 29, which can themselves provide this function for such small stacks. Particularly for such small stacks the weight of the snubbers 29 also provide assistance in holding down the lead edge area of the stack.

The exemplary copier 10 processor illustrated in FIGS. 4–6 and its controller 100 will now be described in further detail. The copier 10 conventionally includes a xerographic photoreceptor belt 12 and the conventional xerographic stations acting thereon (not shown) for respectively charging, exposing, developing, driving and cleaning the photoreceptor. The copier 10 is adapted to provide duplex or simplex precollated copy sets from either duplex or simplex original documents copied from the same RDH 20.

Copy sheet trays, e.g. 106 are provided for feeding clean copy sheets. The copy sheets are fed from tray 106 to the transfer station 112 for the conventional transfer of the xerographic toner image of a document page to the first side of the copy sheet. The copy sheets here are then fed by a vacuum transport to a conventional roll fuser 114 for the fusing of the toner image thereon. From the fuser, the copy sheets are fed on to a gate or fingers which functions as an inverter selector. Depending on the position of that gate the copy sheets will either be deflected into a conventional sheet inverter 116 (path "I") or bypass the inverter 116 (path "I'"). Those copy sheets which bypass the inverter 116 turn 90° in the sheet path I' which inverts the copy sheets into a face-up orientation, i.e. so that the image side which has just been transferred and fused is face-up at this point. If the inverter 116 path is selected the opposite is true (the last printed face is down). Another decision gate here then either passes the sheets directly on without further inversion into the output path 128 of the copier, or deflects the sheets into a duplex inverting transport path, (dashed line path) which further inverts and stacks copy sheets to be duplexed in a duplex tray 108. This is shown by dashed lines in FIGS. 5 and 6. The duplex tray 108 provides intermediate or buffer storage for those copy sheets which have been printed on one side and on which it is desired to subsequently print an image on the opposite side thereof, i.e. the sheets being duplexed. Due to the sheet inverting, these buffer set copy sheets are stacked into the duplex tray 108 face-down here. They are stacked in this duplex tray 108 on top of one another in the order in which they were copied. The control of all sheet feeding is, conventionally, by the machine controller 100, as previously described.

For the completion of duplex copying, the previously simplexed copy sheets in the tray 108 are fed seriatim by a bottom feeder from the bottom of the duplex tray 108 back to the transfer station 112 for the imaging of their second or opposite side page image, through basically the same copy sheet path as is provided for the sheets from the tray 106. It may be seen that this copy sheet feed path here between the duplex tray feeder and the transfer station 112 has an inherent inversion which inverts the copy sheets once. However, due to having previously stacked these sheets face-down in the tray 108, they are presented to the transfer station 112 in the proper orientation, i.e. with their blank or opposite sides facing the photoreceptor 12 to receive the second side image. The now duplexed copy sheets are then fed out through the same output path through the fuser 114 past the inverter 116 to be fed out into the output path 128.

The output path 128 transports finished copy sheets (simplex or duplex) either to another output tray, or, preferably, to a finishing station where the completed precollated copy sets may be separated and finished by on-line stapling, stitching, glueing, binding, and/or offset stacking. In either case, stacking is provided as shown in FIGS. 4–6.

It is desirable to minimize the operation of the copy sheet output inverter 116, in order to simplify and shorten the paper path and increase its reliability. Its use also depends on the inherent inversions provided within the paper path of the copier. With the copying methods herein, as shown in FIGS. 4-6 the inverter 116 need not be used in any normal copying mode. It may be used merely for certain job recovery modes or other special operations. Proper face-down 1-N output stacking for copy set collation is provided here by a single, and consistent, built-in inversion in the output path 128 before stacking. If the copier itself has one less internal inversion, this would not be needed either.

Since the copy sheets are generated in forward serial (1 to N) page order, simplex copy sheets can be properly collated by being output stacked seriatim on top of the prior sheets in the same order, if they are stacked face-down. Thus, when the operator picks up an individual completed stack or bound set of copy sheets and turns it over, it will be in the proper forward page order (1 to N) from the top of the stack to the bottom thereof.

The same is true for duplex copying output, but with additional output collation requirements, depending on which side is printed last. Also a next lower, and odd, document page number must be on one side of a duplex copy sheet and the next higher, and even, document page number must be on the opposite side of that same copy sheet. The 1 to N outputted duplex copies must be in the proper collated page order ½; ¾; 5/6; etc. Providing collated output is made more difficult by the fact that the total overall copy sheet path for the copies being duplexed is typically different, i.e., contains more inversions, than the overall copy path for copy sheets which are only being simplexed, since it is necessary to turn the duplex copy sheet over to present its opposite side for the second copying pass. It is desirable to have commonality, i.e., to utilize the same sheet feeding path to the maximum extent possible for both duplex and simplex copies, and to thus avoid using a different output inverter. Thus here, for the reasons described, it is preferred (but not essential), to print the odd page number sides last for duplex, i.e. to put even side copies 2, 4, 6, etc., into the buffer tray 108. If the 1 to N order second sides printed last are *odd* they may be stacked in the output face-*down* as shown in FIGS. 5 and 6. Thus, this same output path, avoiding the inverter 116, is used for both simplex and duplex copies made from both simplex and duplex documents with this RDH unit 20, which is an important advantage.

If it is desired to pivot away the RDH 20 from the platen 23 to provide alternative manual document copying in the normal 1 to N page order, or to provide a semi-automatic document feeder which is manually stream fed documents by the operator in normal 1 to N page order, an output inverter 116 also need not be utilized, yet face-down output with proper collation for simplex or duplex copies is provided in this case as well, i.e. the same paper path may be used for all these copying modes.

As noted above, pre-printed, e.g. letterhead, paper sheets should not have a first even page printed on the front (preprinted) side. Page 1 must be on the letterhead side and oriented with the printing direction. This is an additional complication for duplex copies.

By way of further background, as noted above, there is an additional problem in the situation where there is an odd rather than even number of simplex document pages to be copied onto a duplex copy set. (See FIG. 5) This also encourages the copying of even pages first and odd pages last (onto the backside of even page copy sheets fed from the buffer tray 108). With an odd number of document pages the Nth or last page of the set of duplex copies made therefrom is really a simplex copy, because the last copy sheet page in each copy set will have an image on only one side thereof. It is undesirable to run this last duplex copy sheet through the transfer station a second time for the pseudo printing of a blank image on the backside thereof, simply to obtain an additional inversion of that last sheet to maintain output collation, since this wastes processing time and also can cause undesirable background contamination of the blank backside of this last sheet. This can be avoided by only putting even pages in the duplex tray 108 and directly outputting the Nth (last page) duplexed copy sheet immediately after its first side is printed rather than feeding it into the duplex tray. Thus, this last odd page can be printed on a clean copy sheet fed from a copy sheet tray, rather than from the duplex tray. (However, this normally results in this last copy sheet having a different number of inversions, as discussed below). However, to treat an Nth odd duplex copy page differently in this manner, it must be known in advance whether there is an odd or even number of simplex documents. Where the documents are being copied in forward serial order, i.e. 1 to N, as in this system, this is not a problem. The Nth copy sheet page will only need to be fed and copied *after* the last (Nth) document in the set has been counted, and the bail switch actuated, which determines whether or not N is an odd number. Note in FIG. 5 that it is the last copy sheet (3) in the output tray that has a "blank" page on the back of the last odd page (page 5 here).

Note in contrast that in the conventional prior art systems that when the simplex documents are copied in reverse serial order (N to 1), that the *first* (Nth) duplex copy sheet fed will be the one requiring special duplex processing. i.e., having a blank backside when N is odd. Since this Nth copy sheet is fed first it is not known whether the Nth document page is odd or even until *after* the first document set circulation, which reduces the efficiency of the system.

The present system does not have this problem. Taking the FIG. 5 example of a five page simplex document set of five simplex document sheets to be duplex copied with the present system, they would be loaded face-up into the tray 22 in their proper and normal top-to-bottom page order: 1, 2, 3, 4, 5, as shown in FIG. 5. They would then be copied here in all their circulations through path 54 in that same forward page order. However, in the first circulation the odd documents would not be copied so that the buffer tray 108 can be loaded with only (two) copy sheets printed with even pages (2 and 4) only, face-down, with page 2 on the bottom, as shown. On the next, and all but the last, document circulations *all* document pages are copied. The odd document pages 1 and 3 are copied, in that order, respectively, onto the copy sheets bearing pages 2 and 4 fed from the duplex tray 108. But the Nth odd page 5 here may be copied onto a clean copy sheet fed from tray 106. The controller 100 already knows that N is an odd page, because the entire document set has been counted by the time that copy sheet must be fed with this 1 to N system. Thus, the controller knows what Nth copy sheet to feed. Meanwhile, also during the second and subsequent document set circulations the even pages 2 and 4 are being copied again and fed into duplex tray 108 in preparation for the next document circulation. This is repeated for as many circulations as desired (the number of desired copy sets dialed into the controller 100). Then on the final circulation only the *odd* document pages are copied to empty the buffer tray 108.

For said simplex-duplex copying, by loading letterhead or other special paper face-down in the tray 106 and copying even page documents on the first circulation, the even pages will be properly printed on the backsides of the letterhead copy sheets here, since the copy paper path here contains one inversion between tray 106 and the transfer station 112. Then on the next circulation these duplex copy sheets will have odd pages 1, 3, 5, etc. properly printed on their first (letterhead) sides, if there are an even number of document pages. However, for an odd number of document pages, the above-described special processing of the last (simplex) copy sheet would cause the last odd document page to be improperly printed on the backside of a clean letterhead copy sheet fed from tray 106. This can be avoided by providing a "special paper" or "letterhead paper" or the like operator button on the copier console for the controller 100. The controller can then be programmed to detect the quadruple coincidence of signals from (1) this "special paper" button being pressed, (2) an odd document sheet count (which is available in advance of the last copy in this 1 to N system), and (3) the "simplex document" and (4) "duplex copy" buttons also having been pressed. Upon detection of all four conditions the controller 100 can direct an extra or "dummy" final (N+1) "even" page copy to be made and fed to the duplex tray 108 (as if there were a real N+1 even document page). No document is fed, only a copy sheet, and the conventional photoreceptor erase lamp or document exposure lamps are turned on to discharge the photoreceptor in the area which meets up with this "blank" copy sheet in the transfer station, so that no significant toner is transferred thereto. This "dummy" or blank letterhead page is now properly inverted to receive the real odd Nth document page on its letterhead side. As an alternative, this can be done without a "special paper" button in all cases where the three conditions (2), (3) and (4) occur. (Note that (3) and (4) may be a single combined "simplex/duplex" signal). Alternatively, if odd pages are copied first, the odd Nth page can be copied onto a clean copy sheet and differently inverted. In FIG. 2 this would require inverting in 116 all but the 3rd copy sheet "blank/5" output and the duplex tray 108 would have sheets 3 and 1 rather than 4 and 2 as shown, respectively, but would consistently properly handle face-up loaded special paper from 106. Thus, all special or ordinary papers may be loaded the same way (same facing and orientation) in tray 106 regardless of the copying mode.

At the end of the last circulation of the document set the documents preferably have been automatically restacked properly pre-collated in the document handler tray 22, for removal in collated order by the operator. With this system they are automatically so restacked in the proper order at the end of copying.

As shown in FIG. 6 a duplex/duplex copying system, compatible with the simplex/simplex and simplex/duplex systems disclosed herein, can be provided, as generally disclosed in the above-cited U.S. Pat. No. 4,166,614 to T. J. Hamlin et al. or the cited U.S. Ser. Nos. 71,613 or 57,855. The preferred duplexing system is to copy only the same sides of each duplex document sheet for several circulations, storing the copies thereof in the duplex tray 108, turning the document sheets over during a subsequent circulation, and then copying only the opposite sides of all the document sheets onto the opposite sides of the copy sheets fed back from the duplex tray 108.

For compatible duplex/duplex copying here, the duplex documents may be loaded face-up in the same over-platen stacking area and copied in the same 1 to N order as the simplex documents. As shown in FIG. 6, loading an exemplary five page (3 sheet) duplex document set into the tray 22 face-up, the duplex document pages in the tray 22 would be in an initial stacked page order, top-to-bottom, of: $\frac{1}{2}$; $\frac{3}{4}$; 5/blank. The first document sheet, pages $\frac{1}{2}$, would be on the top of the stack with page 1 facing up. To copy such a duplex document set so that the even page sides are copied first, as is preferred for duplex copying here, the duplex path 58 would be utilized in the first circulation of the document set. The controller 100 is instructed by its software to provide this path in response to the "duplex document" switch on its console having been actuated by the operator. Since duplex/simplex copying is not provided here, this same duplex document switch also automatically selects the duplex copy mode. On the first duplex document circulation, the first duplex document sheet $\frac{1}{2}$ will be non-inverted as it is fed from the stack to the platen through path 58, thereby placing the page 2 side of the document sheet face-down on the platen 23 to be copied. The following pages 4, 6 and blank would then be fed to be copied in the same manner, and the documents would then automatically restack in tray 22 with the even page sides up. Thus, for the subsequent circulations in which the same (even page) sides of the 1 to N order duplex document set are copied the other document feed path 58 would be utilized. In a subsequent circulation the non-inverter path 58 may be utilized again to invert the documents again.

Thus, this simplex/duplex system is fully compatible with the system disclosed in the above-cited U.S. application Ser. No. 71,613 to R. B. Sahay, in which the non-inverter path 58 is only utilized intermittently between successions of plural copying circulations, i.e. in which plural buffer sets are placed in the duplex tray 108 and the document inverter operation path 58 is utilized only during single document circulations at the beginning or end of a succession of circulations, after the document set has been circulated by a number of times equal to the copy sheet capacity of the tray 108 divided by the number of document sheets in the document set, thereby significantly reducing the number of circulations requiring the operation of the inverter, except for very large document sets. Thus, for the above example of a three sheet duplex document set, and with an example of a 99 sheet capacity duplex tray 108, dividing three into 99 gives a 33 circulation number. Thus, the set of duplex documents here would be circulated once through path 58 and 32 times through path 54 at the beginning of copying to form 33 three sheet buffer sets in the tray 108; i.e. 33 sets of three copy sheets each bearing pages 2, 4, blank, respectively as shown. Then on the 34th document circulation the duplex document set would be circulated once again through the path 58. Then the document set would be circulated again through the path 54 for the next 32 circulations. In these circulations, the pages 1, 3 and 5 would be printed, in that order, 33 times, on the back of the buffer set sheets fed from the duplex tray 108 until all 33 duplex copy sets have been printed and exited. Then this sequence would repeat, (assuming that more than 33 copy sets had been requested by the operator through the appropriate switch selection in the controller 100).

The disclosed copier and document handler unit here can automatically handle a wide latitude of original document sets with a minimum of operator interaction. In a typical job, the operator need only drop the set of documents to be copied into the loading tray 22 on top of the RDH 20, program the desired number of copies to be made in the controller 100 switches, indicate if duplex documents rather than simplex have been loaded (by pressing a button on the controller 100), and then initiating the copying run sequence by pressing the conventional "start print" button on the controller. There may, of course, be some adjustment needed for side or rear guides in the tray 22 for different sizes of documents. Except for jam clearance, there would normally be no other operator interaction required with the copier or document handler to provide precollated output sets.

While the 1 to N document precollation copying system disclosed herein is preferred, it will be appreciated that various alternatives, modifications, variations or improvements thereon may be made by those skilled in the art, and the following claims are intended to encompass all of those falling within the true spirit and scope of the invention.

I claim:

1. In an over-platen document handling apparatus for recirculating document sheets to the imaging station of a copier with means for seriatim feeding and inverting a set of individual conventional flimsy document sheets unescorted (without a carrier) to and from a stack of document sheets loaded in a stack support overlying the imaging station, to provide for properly collated output copy sets from the copier, the improvement comprising:
    first sheet feeding means for feeding document sheets from one end of the top of said stack seriatim in forward serial page order for copying at the imaging station, which document sheets have been loaded face-up in said stack support in normal forward serial page order so that the first page sheet is on top of the stack,
    second sheet feeding means for inverting the document sheets once between said feeding from the top of the stack and said imaging station,
    third sheet feeding means for inverting the document sheets once more between said imaging station and the bottom of said stack, and
    fourth sheet feeding means for restacking the copied document sheets seriatim on the bottom of said stack in said same stack support in the same order and without interfering with said first sheet feeding means, to provide substantially continuous document sheet recirculation in said forward serial page order, so that the copy output will be in forward serial page order, in which said fourth sheet feeding means includes stack reregistration means for impeding the forward movement of a document sheet being restacked at a forward edge registration position for said stack, in which said stack reregistration means is normally extendible above the floor of said stack support at the forward edge thereof and is automatically deflectable to a nonsheet impeding position by said first sheet feeding means for stacks of less than a predetermined thickness.

2. In an over-platen document handling apparatus for recirculating document sheets to the imaging station of a copier with means for seriatim feeding and inverting a set of individual conventional flimsy document sheets unescorted (without a carrier) to and from a stack of document sheets loaded in a stack support overlying the imaging station, to provide for properly collated output copy sets from the copier, the improvement comprising:
    first sheet feeding means for feeding document sheets from one end of the top of said stack seriatim in forward serial page order for copying at the imaging station, which document sheets have been loaded face-up in said stack support in normal forward serial page order so that the first page sheet is on top of the stack,
    second sheet feeding means for inverting the document sheets once between said feeding from the top of the stack and said imaging station,
    third sheet feeding means for inverting the document sheets once more between said imaging station and the bottom of said stack, and
    fourth sheet feeding means for restacking the copied document sheets seriatim on the bottom of said stack in said same stack support in the same order and without interfering with said first sheet feeding means, to provide substantially continuous document sheet recirculation in said forward serial page order, so that the copy output will be in forward serial page order,
    in which said fourth sheet feeding means includes a narrow central elongated interruptable vacuum sheet transport belt extending from adjacent one end of the stack support towards the other end of said stack support to transport one sheet at a time under the stack so that said fourth sheet feeding means restacks sheets from the opposite end of said stack, but in the same movement direction, as that from which document sheets are fed by said first sheet feeding means, and
    said fourth sheet feeding means further includes stack air flotation means underlying said stack except in said vacuum belt area to enable said vacuum belt to transport said one sheet thereunder, and said fourth sheet feeding means further including stack reregistration means for impeding the forward movement of each sheet being so restacked on the bottom of the stack at a forward edge registration position for said stack, said stack reregistration means being adapted to not interfere with said first feeding means for feeding sheets from the top of the stack regardless of the stack height.

* * * * *